US008421568B2

(12) United States Patent
Deland

(10) Patent No.: US 8,421,568 B2
(45) Date of Patent: Apr. 16, 2013

(54) SOLENOID ARRANGEMENT WITH SEGMENTED ARMATURE MEMBER FOR REDUCING RADIAL FORCE

(75) Inventor: Daniel L Deland, Davison, MI (US)

(73) Assignee: BorgWarner Inc., Auburn Hills, MI (US)

( * ) Notice: Subject to any disclaimer, the term of this patent is extended or adjusted under 35 U.S.C. 154(b) by 54 days.

(21) Appl. No.: 13/144,963

(22) PCT Filed: Jan. 20, 2010

(86) PCT No.: PCT/US2010/021463

§ 371 (c)(1),
(2), (4) Date: Jul. 18, 2011

(87) PCT Pub. No.: WO2010/088109

PCT Pub. Date: Aug. 5, 2010

(65) Prior Publication Data

US 2011/0285485 A1 Nov. 24, 2011

Related U.S. Application Data

(60) Provisional application No. 61/206,081, filed on Jan. 27, 2009.

(51) Int. Cl.
*H01F 3/00* (2006.01)
*F16K 31/02* (2006.01)

(52) U.S. Cl.
USPC ....................... 335/279; 335/261; 251/129.16

(58) Field of Classification Search .................. 335/261, 335/279; 251/129.16
See application file for complete search history.

(56) References Cited

U.S. PATENT DOCUMENTS 5,252,938 A 10/1993 Bishop
2006/0114089 A1 6/2006 Schempp et al.
2008/0272871 A1 11/2008 Bamber et al.

FOREIGN PATENT DOCUMENTS

KR 10-2008-0000670 A 1/2008
KR 10-2008-0114738 A 12/2008

OTHER PUBLICATIONS

International Search Report and Written Opinion for Application No. PCT/US2010/021463 Filed on Aug. 26, 2010.

*Primary Examiner* — Ramon Barrera
(74) *Attorney, Agent, or Firm* — Warn Partners, P.C.

(57) ABSTRACT

A solenoid arrangement having an armature member that is segmented to help minimize the radial force due to eccentricity of the armature member. The solenoid arrangement has a magnetic coil that when energized will create magnetic flux in the flux path. A pole piece is partly circumscribed by the armature member. Inner and outer air gaps are located about the armature member. Eccentricity of the armature member results in a decrease in one of the air gaps and a corresponding increase in the other. Radial gaps segment the armature member to interrupt the circumferential flux path about the armature member to inhibit magnetic flux from swirling to the side nearest the pole piece and to distribute magnetic flux substantially evenly. The radial force acting on the armature member is reduced resulting in reduced friction between solenoid components while substantially preserving the desirable level of axial force.

16 Claims, 8 Drawing Sheets

SOLENOID ARRANGEMENT WITH SEGMENTED ARMATURE MEMBER FOR REDUCING RADIAL FORCE

FIELD OF THE INVENTION

The present invention relates to a solenoid arrangement having an armature member that is segmented to reduce a radial force that occurs from armature eccentricity.

BACKGROUND OF THE INVENTION

Solenoids are generally known and used for a variety of purposes. In some applications it is useful to have a solenoid that provides a relatively constant force over a relatively long stroke. This type of solenoid, commonly called a linear solenoid, uses a variable overlap in the working air gap generally associated with an armature to generate an electromagnetic force in the direction of the solenoid axis extending along the longitudinal length of the armature. Undesirable eccentricity of the armature is an inherent problem with solenoids. Conventional solenoids have two air gaps disposed axially along the armature so that eccentricity of the armature causes both air gaps to be reduced. Any eccentricity of the armature will cause uneven distribution of magnetic flux and will result in an undesirable radial force acting perpendicular to the solenoid axis. Manufacturing imperfections in the solenoid components, clearance with the bearings associated with the armature, assembly of the solenoid components in less than perfect alignment, and the like can all contribute to eccentricity.

Typically, the force generated in the air gap of a solenoid acts to move the armature in a direction that will reduce the reluctance of the air gap. The reluctance of the air gap in a magnetic circuit is proportional to the area of the air gap and inversely proportional to the distance of the gap. As such, an eccentric armature will be more strongly attracted toward the nearer side of the pole piece of the solenoid. Thus, an increased radial force acting on the armature will be applied to any associated component surfaces, e.g., between an armature pin and bearing surfaces, resulting in friction between components. Friction with the components degrades the performance of the solenoid and causes wear.

Accordingly, there exists a need for an improved solenoid arrangement that helps to minimize the radial force due to eccentricity while substantially preserving the level of axial force.

SUMMARY OF THE INVENTION

The present invention is directed to a solenoid arrangement or solenoid having an armature member that is segmented to help minimize the radial force due to eccentricity of the armature member. The solenoid arrangement has a magnetic coil that when energized will create magnetic flux in the magnetic circuit. An armature member is moveably disposed in association with air gaps of the magnetic circuit to impart force and do work. A pole piece is located in operable association with a central portion of the armature member such that the pole piece is partly circumscribed by the armature member. Inner and outer air gaps are located about the armature member such that eccentricity of the armature member results in a decrease in one of the air gaps and a corresponding increase in the other, e.g., eccentricity of the armature member toward the solenoid axis or pole piece reduces the associated inner air gap while increasing the corresponding outer air gap. A plurality of radial gaps segment the armature member and the segments are uniformly coupled about the circumference of a collar such that each segment is associated with a respective portion of the inner air gap and outer air gap. These radial gaps in the armature member interrupt the circumferential flux path about the armature member. Interrupting the circumferential flux path helps to inhibit the magnetic flux from "swirling" around the armature member to the side nearest to the pole piece, e.g., helps to inhibit the clustering or grouping and uneven distribution of magnetic flux. The radial force that results is significantly less than conventional solenoids. Thus, the friction between the armature member and any associated component surfaces, e.g., between a guide pin and bearing surfaces, is substantially obviated or reduced. It is understood that the use of a flux tube, which is required by conventional solenoids, can be omitted from the solenoid arrangement of the present invention. The improved solenoid arrangement of the present invention having an armature member that is segmented helps to minimize the radial force acting on the armature member due to eccentricity while substantially preserving the desirable level of axial force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
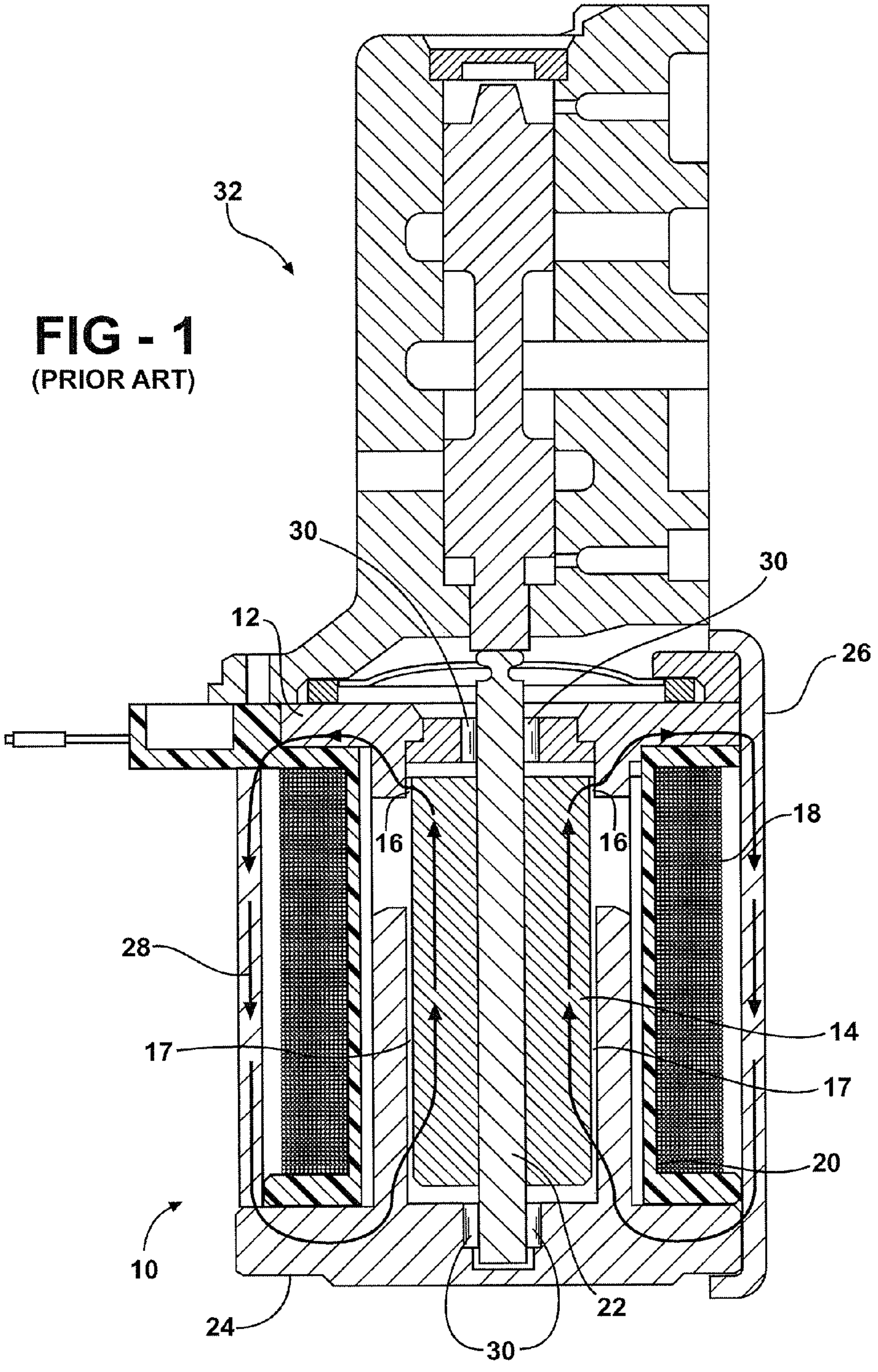
FIG - 1 (PRIOR ART)
FIG. 1 is a cross sectional plan view of a prior art solenoid valve arrangement.

Referring now to FIG. 1, a cross sectional plan view showing a conventional prior art solenoid is shown generally at 10. The solenoid 10 has a pole piece 12 that partly overlaps and circumscribes an armature 14 forming a substantially narrow circumferential air gap, referred to as a working air gap 16, located between the pole piece 12 and the armature 14. The pole piece 12 is a stationary part toward which the armature 14 is magnetically attracted when a coil 18 is energized. The coil 18 at least partly circumscribes a bobbin 20. The armature 14 is formed as a single cylindrical piece having a central axial bore extending along its longitudinal length. The armature 14 and an armature pin 22 are assembled by press fit engagement wherein the armature pin 22 extends through the central axial bore of the armature 14. The solenoid 10 also has a flux tube 24 that substantially overlaps and circumscribes the armature 14 forming a long circumferential air gap, referred to as a cylindrical or return air gap 17, located between the flux tube and the armature 14. The bobbin 20 circumscribes a portion of the flux tube 24 and the pole piece 12.

The solenoid 10 also has a housing 26 which generally forms the outer portion of a flux path in the solenoid 10. When the coil 18 is energized, magnetic flux 28 flows through the flux path consisting of the collection of magnetic components of the solenoid 10, including the armature 14, pole piece 12, housing 26, and the flux tube 24, and flows across the narrowest portion of both the working air gap 16 and the return air gap 17. The armature 14 is depicted as concentric within the working air gap 16 and return air gap 17. The configuration of the armature 14 and armature pin 22 allow the magnetic force applied to the armature 14 to cause movement of the armature pin 22 to act on or push an associated member of a valve portion 32, e.g., a spool valve as illustrated. The solenoid 10 has bearings 30 sized to circumscribe the armature pin 22 and are located in the pole piece 12 and the flux tube 24 to allow axial movement of the armature pin 22.

Eccentricity of the armature 14 causes both the working air gap 16 and the return air gap 17 to narrow on one side and increase on the opposite side as the armature 14 moves toward the pole piece 12 and flux tube 24 respectively. Since magnetic flux 28 crosses the working air gap 16 and the return air gap 17 at the narrowest respective locations, e.g., the location nearest the pole piece 12, there is an uneven distribution of magnetic flux 28 within the flux path, e.g., an increased amount of magnetic flux 28 toward the side which has the narrowest air gaps. This results in an undesirable increase in radial force acting on the armature 14 generally perpendicular to the solenoid's longitudinal axis causing friction between the armature pin 22 and bearing 30 surfaces thereby degrading performance of the solenoid 10 and causing damage and wear to the armature pin 22 and bearing 30 surfaces. Manufacturing and assembly imperfections, necessary or undesirable clearances with the bearings 30, and the like can all contribute to eccentricity of the armature 14.

Figure 2:
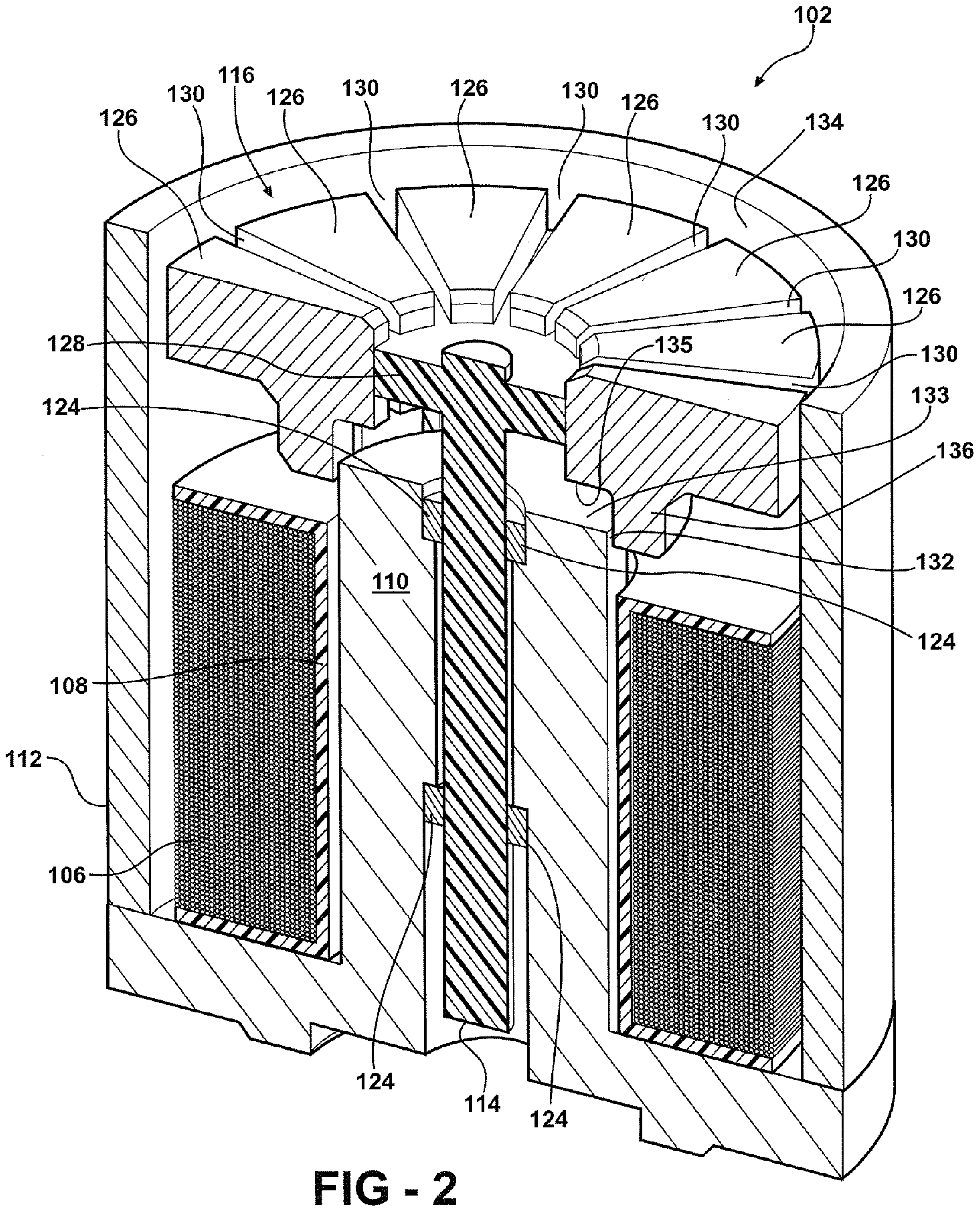
FIG. 2 is a cross sectional perspective view of a solenoid arrangement in accordance with one aspect of the present invention.
Figure 3:
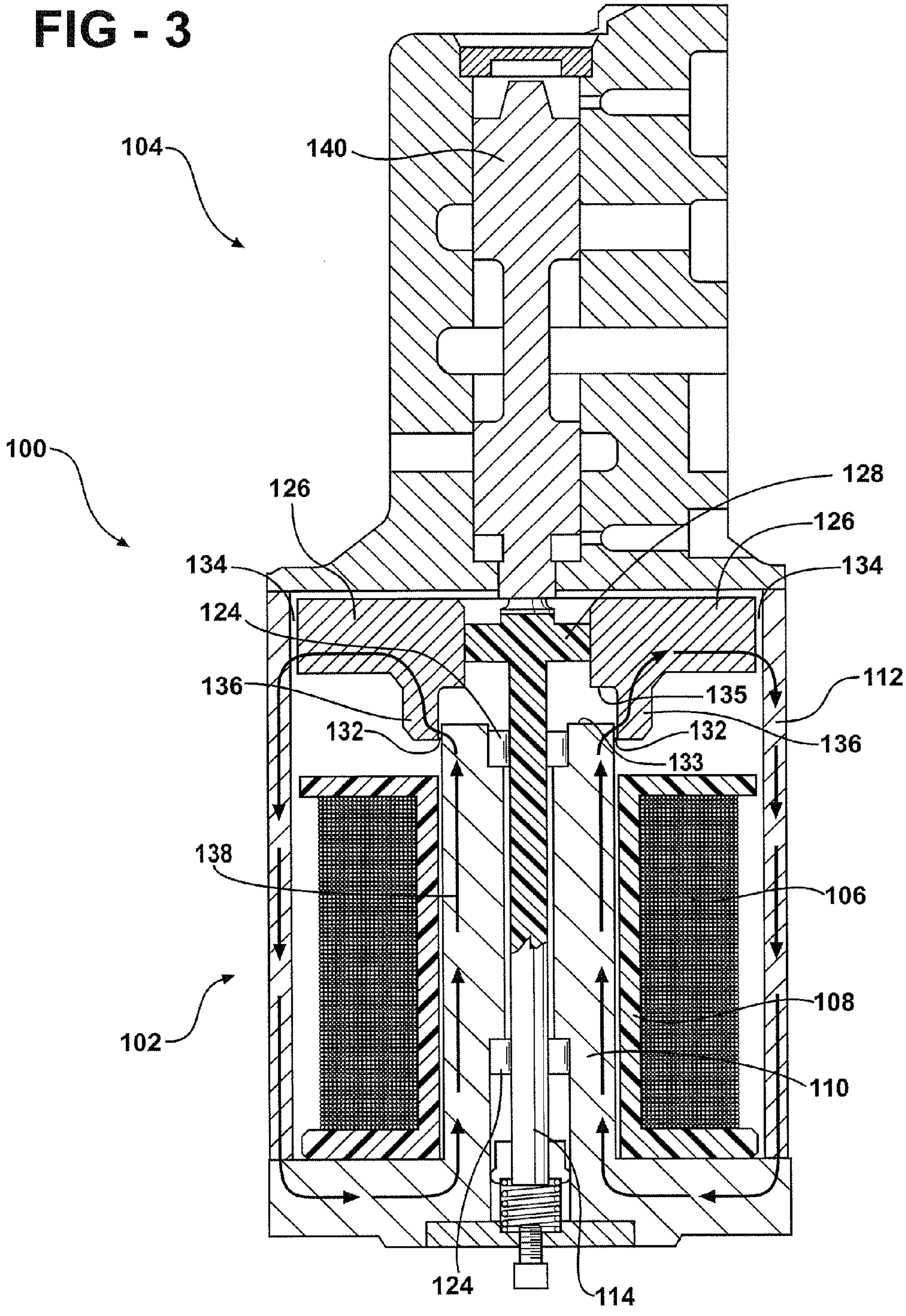
FIG. 3 is a cross sectional plan view of the solenoid arrangement of the present invention, and coupled to a valve portion.
Figure 4:
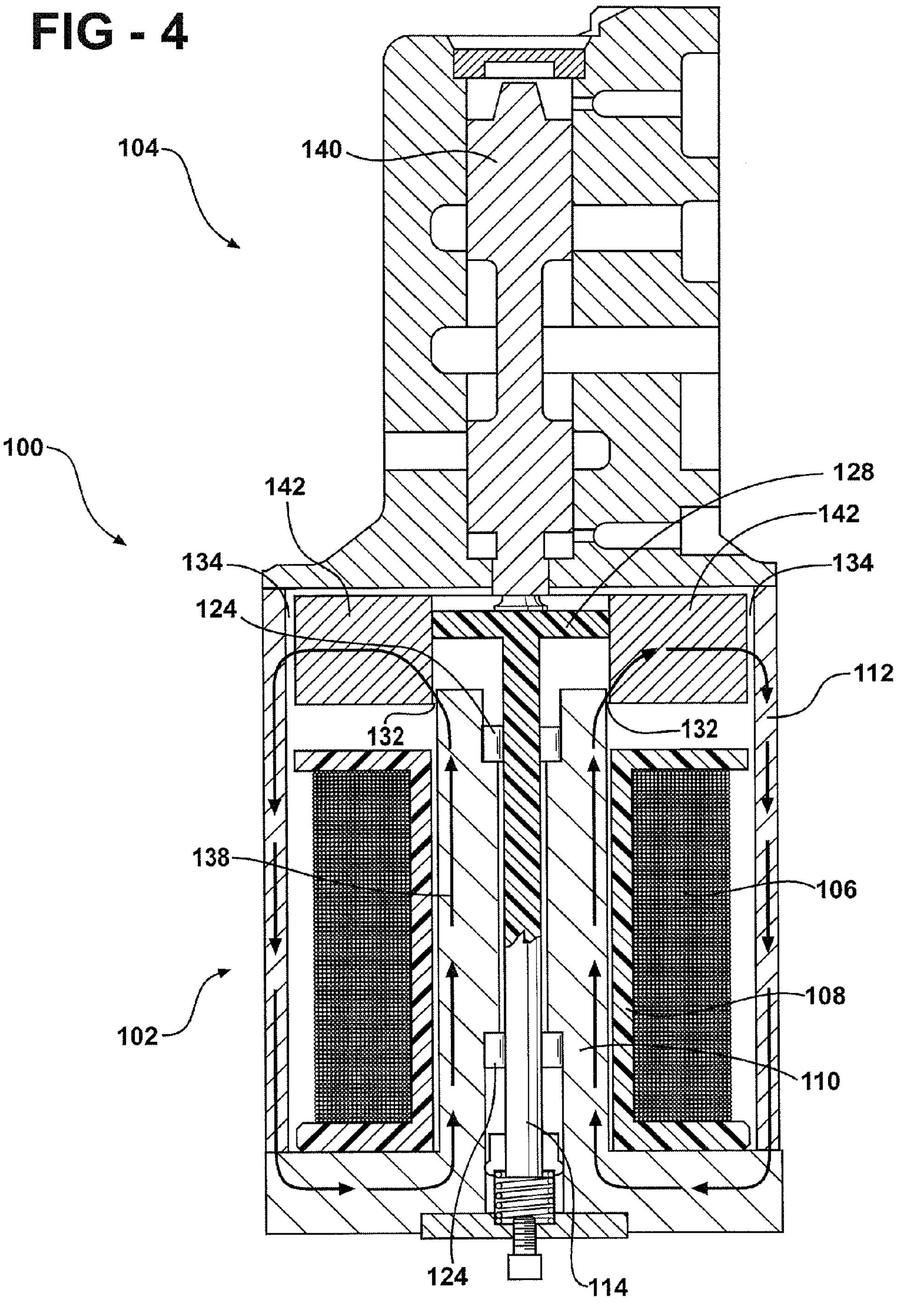
FIG. 4 is a cross sectional plan view of a solenoid arrangement, in accordance with a second embodiment of the present invention, and coupled to a valve portion.

Referring to FIGS. 2 to 4 in general, a solenoid arrangement of the present invention, indicated generally as 102, is illustrated. As further illustrated in FIGS. 3-4, the solenoid arrangement 102 can form part of a solenoid valve arrangement, indicated generally as 100, having an operably connected valve portion 104. The solenoid arrangement 102 has a magnetic coil 106 wound about a bobbin 108, a pole piece 110 that is stationary and coupled to a housing 112, a guide pin 114, and an armature member 116. The housing 112 can generally form the outer portion of the flux path of the solenoid arrangement 102 and at least partly extends past the armature member 116 to at least partly circumscribe the periphery of the armature member 116. The pole piece 110 and the guide pin 114 are assembled such that the guide pin 114 slidably extends within an axial bore of the pole piece 110 and there is clearance between the guide pin 114 and the pole piece 110. Two or more bearings 124 are sized to circumscribe and guide the guide pin 114 and are located within recesses of the pole piece 110 to allow movement of the guide pin 114 relative to the pole piece 110. It is understood that alternatively the magnetic coil 106 can be wound about a mandrel and fused to hold an operable shape rather than using the bobbin 108.

The armature member 116 partly overlaps and circumscribes the pole piece 110 toward the top and is formed of a plurality of segments 126 coupled along the circumference of a collar 128 which can be substantially circular, disk-like shaped, and the like. Radial gaps 130 located between each of the segments 126 are equally spaced about the armature member 116, which is substantially circular, and extend generally transverse to the longitudinal solenoid axis. The guide pin 114 is operably coupled to a central portion of the collar 128 of the armature member 116. A substantial amount of each segment 126 is located along a plane spaced above the pole piece 110 and bobbin 20. Each segment 126 can also have a flux finger 136, shown in FIGS. 2 and 3, operably formed to extend downward to at least partly overlap and circumscribe the pole piece 110. An inner air gap 132 is located between the pole piece 110 and the opposedly disposed innermost surface of the flux finger 136 facing the pole piece 110. An outer air gap 134 is located between the housing 112 and the opposedly disposed outermost surface of the segment 126. By way of non-limiting example, the outer air gap 134 is 0.2 mm wide. The flux fingers 136 can alternatively be omitted and the segments 126 formed substantially as non-finger segments 142, shown in FIG. 4, as is set forth in greater detail below. Referring to FIGS. 2-4 in general, the configuration and dimensions of the armature member 116 and the inner and outer air gaps 132,134 are operable for distributing magnetic flux, indicated generally as flux lines 138, and allow movement of the armature member 116 relative to the pole piece 110 to impart force and do work.

It is understood that the radial gaps 130 can alternatively be unequally spaced about the substantially circular armature member 116, e.g., a repeating sequence of unequal segments of about 25°, about 35°, about 30°, and the like. It is further understood that the widths depicted for the inner and outer air gaps 132,134 in FIGS. 2-4 are illustrative and that the armature member 116 is depicted as substantially concentric within the inner and outer air gaps 132,134 and is not to be construed as limiting.

When the magnetic coil 106 is energized, magnetic flux, indicated generally as flux lines 138, flows through the flux path which generally includes the housing 112, pole piece 110, and armature member 116, and flows across the inner and outer air gaps 132,134. The flux lines 138 crossing the inner air gap 132 cross generally between the pole piece 110 and the flux fingers 136 of the segments 126. The flux lines 138 crossing the outer air gap 134 cross generally between the housing 112 and the outer surface of the segments 126. Some flux lines 138 additionally cross between a pole surface 133 on the top end of the pole piece 110 and a segment step 135 formed in the segments 126 generally facing the pole surface 133. The collar 128 is made of a non-magnetic material, e.g., plastic, aluminum, and some grades of stainless steel, and does not form part of the flux path. The guide pin 114 can be made of the same or different non-magnetic material as the collar 128 and does not form part of the flux path. The distance between the guide pin 114 and the nearest surface of the armature member 116 is operable to provide sufficient isolation from the magnetic circuit. The guide pin 114 can alternatively be made of a magnetic material, e.g., hard steel, for the guide pin 114 to help provide lower friction and even better wear characteristics within the bearings 124.

Eccentricity of the armature member 116 results in a decrease in one of either the inner or outer air gaps 132,134 and a corresponding increase in the other inner or outer air gap 132,134, e.g., eccentricity of the armature member 116 toward the pole piece 110 reduces the associated inner air gap 132 while increasing the corresponding outer air gap 134. The radial gaps 130 in the armature member 116 interrupt the circumferential flux path about the armature member 116. Interrupting the circumferential flux path helps to inhibit the flux lines 138 from "swirling" around the armature member to the side having the inner air gap 132 nearest to the pole piece 110. This helps to inhibit uneven distribution of the flux lines 138 and helps to minimize the radial force acting on the armature member 116 caused by the armature eccentricity. Thus, the friction between the guide pin 114 and bearings 124 is reduced while substantially preserving the desirable level of axial force of the solenoid arrangement 102.

The configuration of the solenoid arrangement 102, in particular the armature member 116, helps to reduce the radial force acting on the armature member 116. Generally, the radial force is reduced to be about one third of that present in conventional solenoids and any reduction in axial force is minimal, e.g., the axial force can be reduced by about 0 to about 15%. Typically, the radial force is reduced by about 60% while the axial force is reduced by only about 15%. By way of non-limiting example, the radial force is reduced by 62% and the axial force is reduced by 17%. By way of another non-limiting example, with about 0.025 mm armature eccentricity and about 0.2 amps to 1.4 amps of applied current, the radial force can be reduced by about 61 to 68% by using the present invention. A reduction in axial force caused by the inclusion of radial gaps 130 in the armature member 116 can at least partly be regained by reducing the size of the inner and outer air gaps 132,134. Any corresponding increase in radial force will still be much less than with conventional solenoids.

The coupling of the collar 128 and guide pin 114 allow the magnetic force applied to the armature member 116 to act on or push an associated actuatable member, e.g., a movable spool 140 of the valve portion 104 of the solenoid valve arrangement 100 as illustrated in FIGS. 3 and 4. FIGS. 3 and 4 illustrate a "high valve" arrangement where the spring force is balanced by the control pressures acting on the ends of the moveable spool 140. In general, magnetic force applied to the armature member 116 subtracts from the spring force, reducing the control pressure output of the valve portion 104. It is within the contemplation of the present invention that a reverse construction of the arrangement is capable to form a "low valve" arrangement. It is understood that the solenoid arrangement 102 described herein can be used in connection with any type of suitable valve portion 104 and the like. By way of non-limiting example, the valve portion 104 can be electric, hydraulic, pneumatic, an exhaust gas recirculation (EGR) bypass valve, a control valve of a turbocharger, a canister purge valve, a spool valve, and combinations thereof. It is further understood that the solenoid arrangement 102 is not restricted to use with only valves.

FIG. 3 depicts one particular embodiment of the solenoid arrangement 102 being used with the valve portion 104 having the moveable spool 140 disposed in the valve portion 104. A housing of the solenoid arrangement 102 is connected to the valve portion 104 in an operable manner. In this particular configuration the moveable spool 140 is in operable association with the central portion of the collar 128 so that when the solenoid arrangement 102 is de-energized the collar 128 operably presses against the moveable spool 140 to move it in a first direction. When the solenoid arrangement 102 is energized, the armature member 116 moves toward the pole piece 110 which causes the moveable spool 140 to move in a second and opposite direction.

Referring to FIG. 4, in accordance with an alternative embodiment of the solenoid arrangement 102 of present invention, the armature member 116 has a plurality of non-finger segments 142 substantially formed without flux fingers 136 that extend downward to circumscribe the pole piece 110. The non-finger segments 142 can have a substantially rectangular-like cross-section, depicted in FIG. 4, square-like cross-section, and the like shapes operable to partly overlap and circumscribe the pole piece 110 toward the top. The non-finger segments 142 are operably coupled along the circumference of the collar 128 and are operably disposed to at least partly overlap and circumscribe the pole piece 110. The radial gaps 130 are located between each of the non-finger segments 142 for interrupting the circumferential flux path about the armature member 116. A substantial amount of each non-finger segment 142 can be located along a plane spaced above the pole piece 110. The inner air gap 132 is located between the pole piece 110 and the opposedly disposed innermost surface of the part of the non-finger segments 142 facing the pole piece 110. The outer air gap 134 is located between the housing 112 and the outermost surface of the non-finger segments 142. The configuration and dimensions of the armature member 116 and the inner and outer air gaps 132,134 are operable for distributing the magnetic flux, indicated generally as flux lines 138, substantially evenly. When the magnetic coil 106 is energized, flux lines 138 flow through the flux path and across the inner and outer air gaps 132,134. The flux lines 138 crossing the inner air gap 132 cross generally between the pole piece 110 and the innermost surface of the part of the non-finger segments 142 facing the pole piece 110. The flux lines 138 crossing the outer air gap 142 cross generally between the housing 112 and the outer surface of the non-finger segments 142.

Referring generally to FIGS. 2-4, it is understood that the solenoid arrangement 102 of the present invention can also have an electrical connector and the magnetic flux goes around the edges of the electrical connector window. It is further understood that the use of a flux tube, which is required by conventional solenoids, can be omitted from the solenoid arrangement 102 of the present invention, as is depicted. It is further within the contemplation of the present invention that the housing 112 can alternatively be at least partly disposed below the plane of the segments 126 or non-finger segments 142 such that the outer air gap 134 is not enclosed or confined by the housing 112. In an alternative embodiment, the segments 126 or non-finger segments 142 can extend further outward than illustrated and can at least partly overlap the thickness of the housing 112 wall such that the outer air gap 134 is not enclosed or confined by the housing 112 and the magnetic flux passes between opposedly disposed surfaces.

The pole piece 110 is depicted as having a portion that is formed with substantially the same diameter throughout. The diameter of the pole piece 110 generally adjacent to the magnetic coil 106 needs only to be large enough to carry magnetic flux without undesired saturation. Having the smallest possible diameter results in the smallest circumference of the bobbin 108 so that more turns of wire can be used for the same coil resistance. More turns in the magnetic coil 106 results in more force in the solenoid arrangement 102 or allows larger air gaps for the same force. The pole piece 110 can alternatively be formed having a portion that is formed with a larger diameter area followed by a smaller diameter area, such that the segments 126 or non-finger segments 142 at least partly overlap and circumscribe the smaller diameter area. It is also understood that the pole piece 110 can alternatively be formed having a portion that is formed with a smaller diameter area followed by a larger diameter area, such that the segments 126 or non-finger segments 142 overlap and circumscribe the larger diameter area. Having a larger diameter area associated with the inner air gap 132 than the smaller diameter area generally circumscribed by the bobbin 108 can provide an increase in area of the inner air gap 132 due to the increased circumference. Permeance of the inner air gap 132 is generally proportional to area and inversely proportional to the inner air gap 132 dimension. The increase in circumference allows for a corresponding increase in the inner air gap 132 which can result in less radial force while still helping to prevent any leakage flux. Leakage flux results when magnetic flux does not pass through the armature member 116 and it does not produce force on the armature member 116.

Figure 5A:
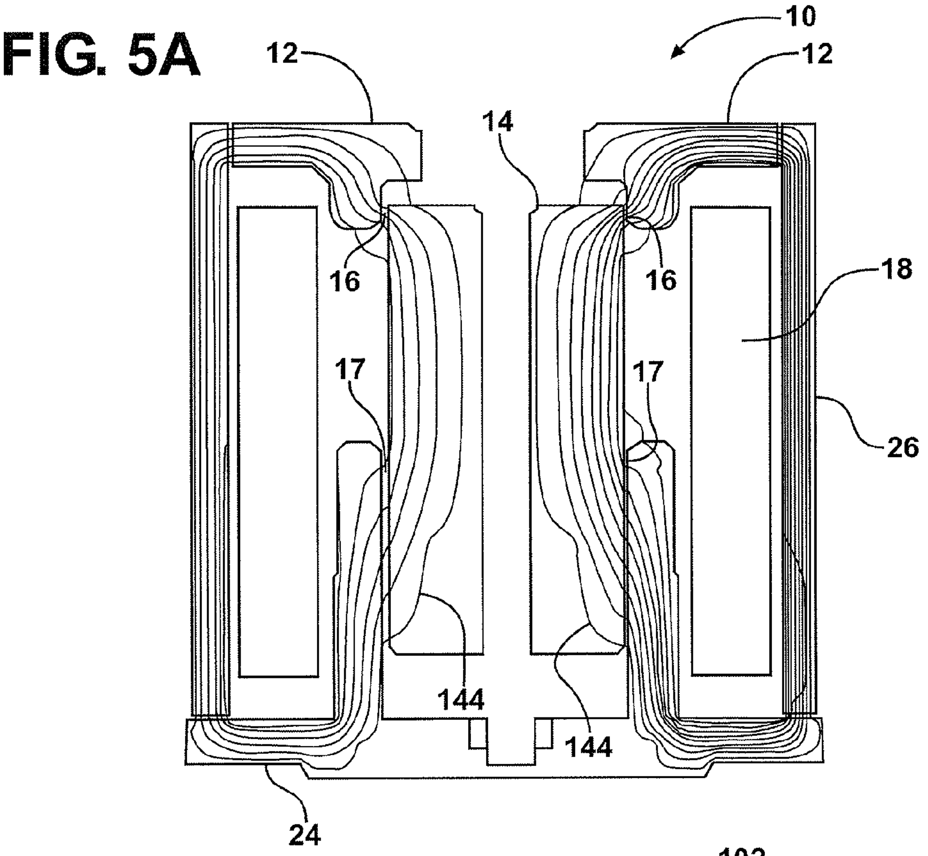
FIG. 5A is a cross sectional plan schematic view of a prior art solenoid with armature eccentricity and uneven distribution of first flux lines.
Figure 5B:
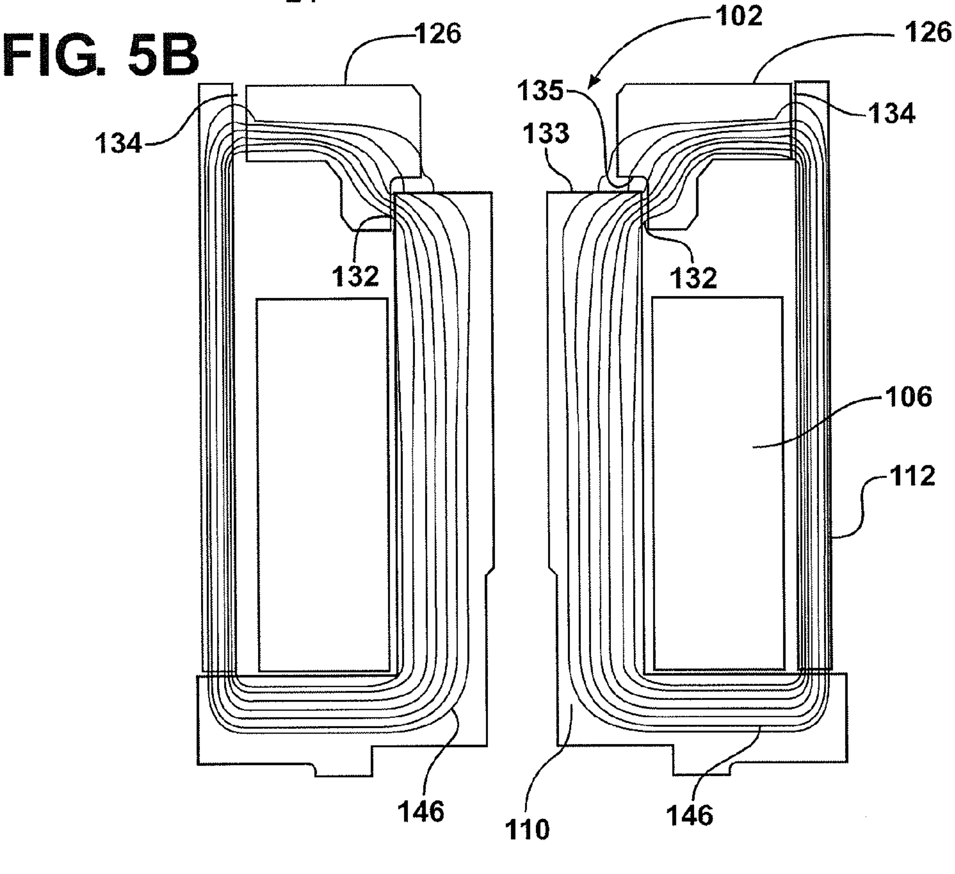
FIG. 5B is a cross sectional plan schematic view of a solenoid with armature eccentricity and substantially even distribution of second flux lines, in accordance with one aspect of the present invention.

FIGS. 5A and 5B are cross sectional plan schematic views showing simplified illustrations of flux paths of solenoids and of the distribution of magnetic flux of a flux path in response to armature eccentricity. Referring to FIG. 5A, first flux lines 144 illustrate the magnetic flux in a conventional solenoid 10 when a coil 18 is energized and with an armature 14 shown eccentric toward the right. Both the working air gap 16 and the return air gap 17 are reduced in the direction of eccentricity, e.g., reduced toward the right, and increased on the opposite side, causing an uneven distribution of magnetic flux. As shown, substantially more first flux lines 144 are illustrated toward the right side of the housing 26, flux tube 24, armature 14, and pole piece 12 than the left because both the working air gap 16 and return air gap 17 are narrower on the right side. Thus, armature eccentricity in the solenoid 10 causes an uneven flux distribution, illustrated by the clustering or grouping of the first flux lines 144 toward the right, resulting in uneven radial force acting substantially perpendicular to the solenoid axis. Referring to FIG. 5B, second flux lines 146 illustrate the magnetic flux in a solenoid arrangement 102 in accordance with the present invention when the magnetic coil 106 is energized and with the segmented armature member 116 is eccentric toward the right. The collar 128 of the armature member 116 is omitted for clarity. The outer gap 134 is reduced in the direction of eccentricity toward the right side while the corresponding inner gap 132 is increased. The segment 126 on the left side is shown toward the right and the inner air gap 132 reduced in the direction of eccentricity while the corresponding outer air gap is increased 134. As shown, the magnetic flux lines are substantially evenly distributed, as illustrated by the non-clustering or grouping of the second flux lines 146, such that the radial force acting on the armature member 116 is reduced. The improved distribution of magnetic flux helps to reduce the radial force acting on the armature member 116 and results in a reduction in friction between solenoid components.

Figure 6:
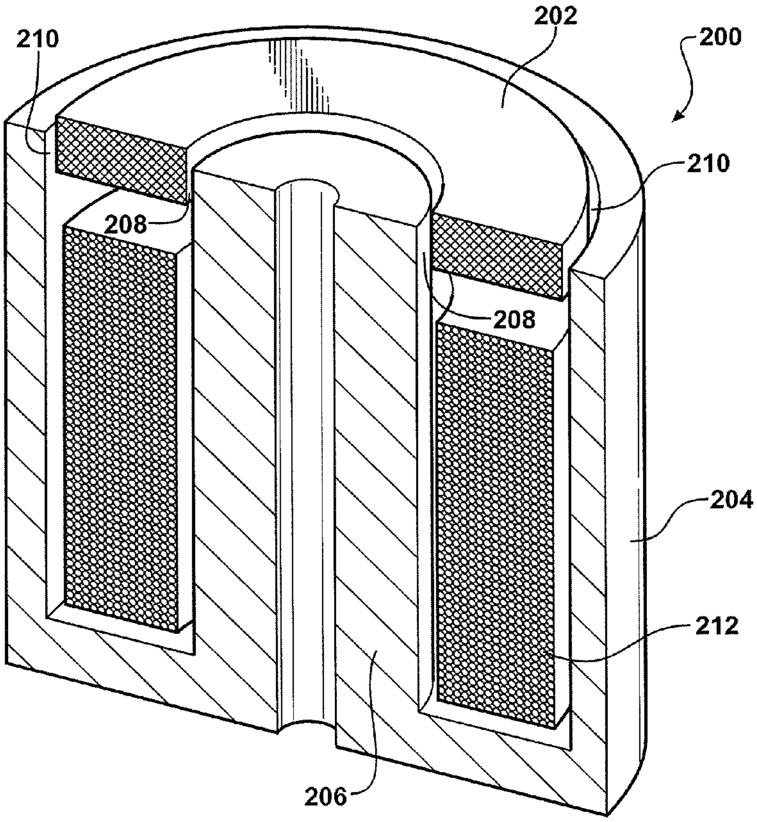
FIG. 6 is a cross sectional perspective view showing a simplified schematic of a solenoid having an unsegmented ring armature that is concentric.
Figure 6A:
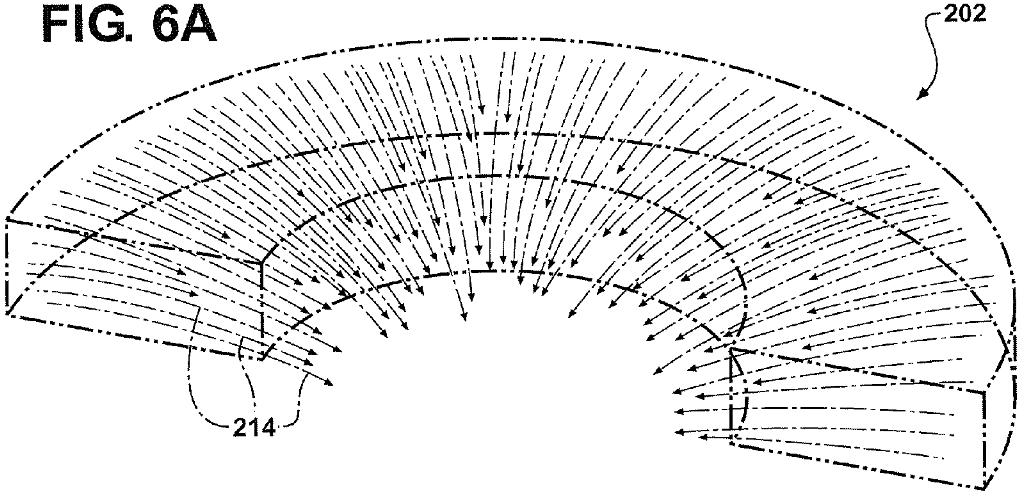
FIG. 6A is a cross sectional perspective schematic view illustrating the concentric unsegmented ring armature of FIG. 6 having a substantially even distribution of flux vectors.

Referring to FIGS. 6 to 8A in general, the figures are cross sectional perspective views showing simplified representations of solenoid arrangements illustrating the general flux paths and distribution of magnetic flux in an armature in response to eccentricity. The air gaps are large and the eccentricity exaggerated to illustrate the eccentricity of an armature within the air gaps and the effect on magnetic flux distribution from segmenting the armature. Referring to FIG. 6, a solenoid, indicated generally as 200, is illustrated having an unsegmented ring armature 202 that is concentric, a housing 204 portion, and a pole piece 206 portion. A first air gap 208 is located between the pole piece 206 and the unsegmented ring armature 202. A second air gap 210 is located between the unsegmented ring armature 202 and the housing 204. When a coil 212 is energized, magnetic flux flows through the housing 204, pole piece 206, unsegmented ring armature 202, and across the first and second air gaps 208,210. FIG. 6A illustrates the unsegmented ring armature 202 of FIG. 6 having a plurality of flux vectors, indicated generally as 214, extending radially and substantially evenly distributed about the concentric unsegmented ring armature 202. Since the unsegmented ring armature 202 is concentric within the first and second air gaps 208,210, the magnetic flux and corresponding radial force is substantially evenly distributed.

Figure 7:
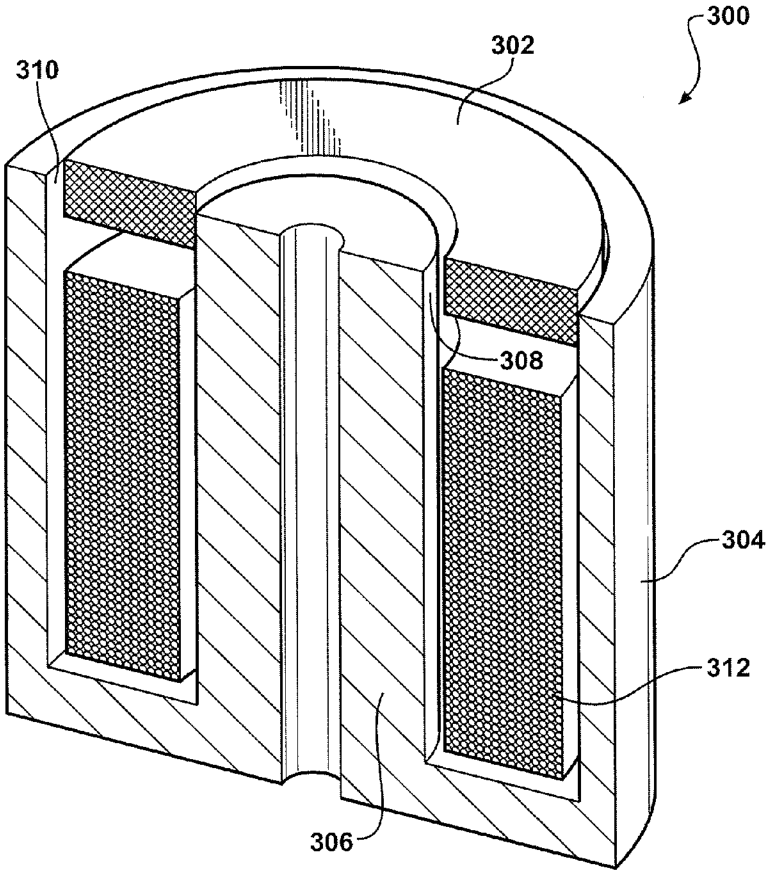
FIG. 7 is a cross sectional perspective view showing a simplified schematic of a solenoid having an unsegmented ring armature that is eccentric.
Figure 7A:
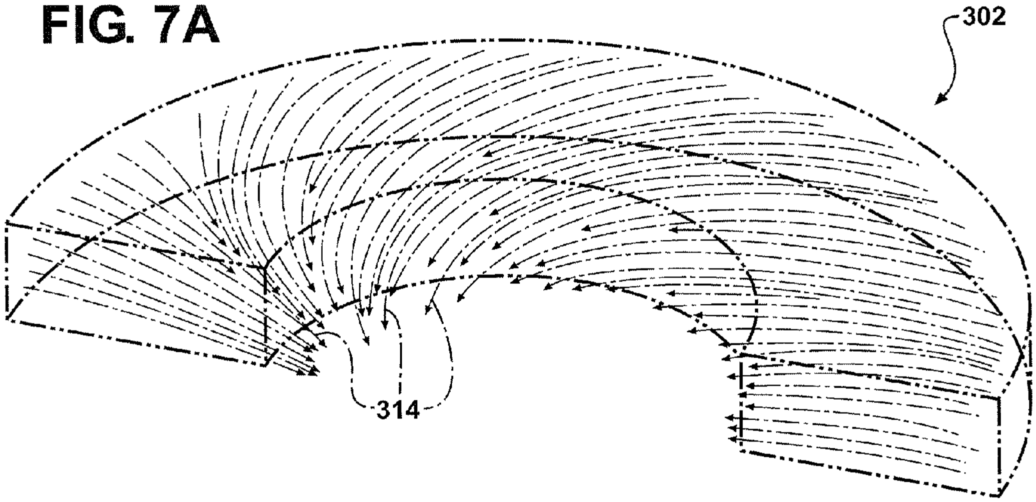
FIG. 7A is a cross sectional perspective schematic view illustrating the eccentric unsegmented ring armature of FIG. 7 having substantially uneven and swirling distribution of flux vectors.

Referring to FIG. 7, a solenoid, indicated generally at 300, is illustrated having an unsegmented ring armature 202 that is eccentric toward the right, a housing 304 portion, and a pole piece 306 portion. A first air gap 308 is located between the pole piece 306 and the unsegmented ring armature 302. A second air gap 310 is located between the unsegmented ring armature 302 and the housing 304. The illustrated eccentricity of the unsegmented ring armature 302 is exaggerated in that the unsegmented ring armature 302 is shown nearly in physical contact with the right side of the housing 304. When a coil 312 is energized, magnetic flux flows through the housing 304, pole piece 306, unsegmented ring armature 302, and across the first and second air gaps 308,310. FIG. 7A illustrates the unsegmented ring armature 302 of FIG. 6 having a plurality of flux vectors, indicated generally as 314. The flux vectors 314 flow circumferentially within the unsegmented ring armature 314 to cross the shortest air gap, e.g., the flux vectors 314 “swirl” around the unsegmented ring armature 314 to the side nearest the pole piece 306. Since the unsegmented ring armature 302 is eccentric toward the right the magnetic flux is not evenly distributed.

Figure 8:
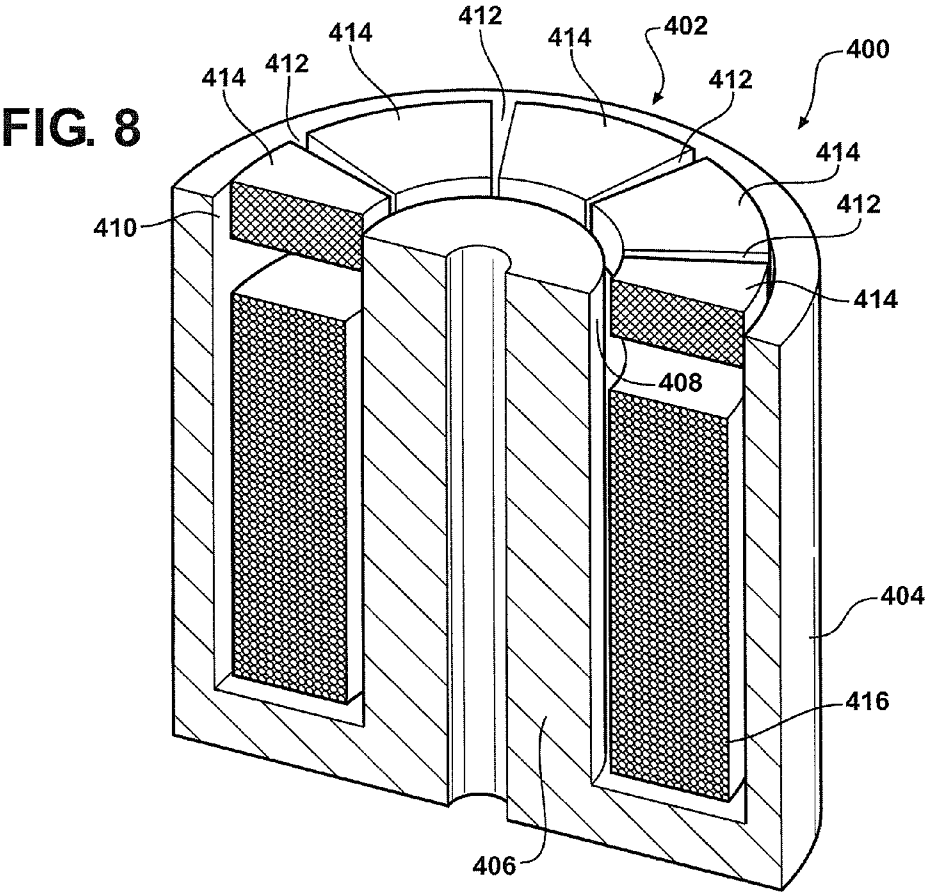
FIG. 8 is a cross sectional perspective view showing a simplified schematic of a solenoid having a segmented ring armature that is eccentric, in accordance with one aspect of the present invention.
Figure 8A:
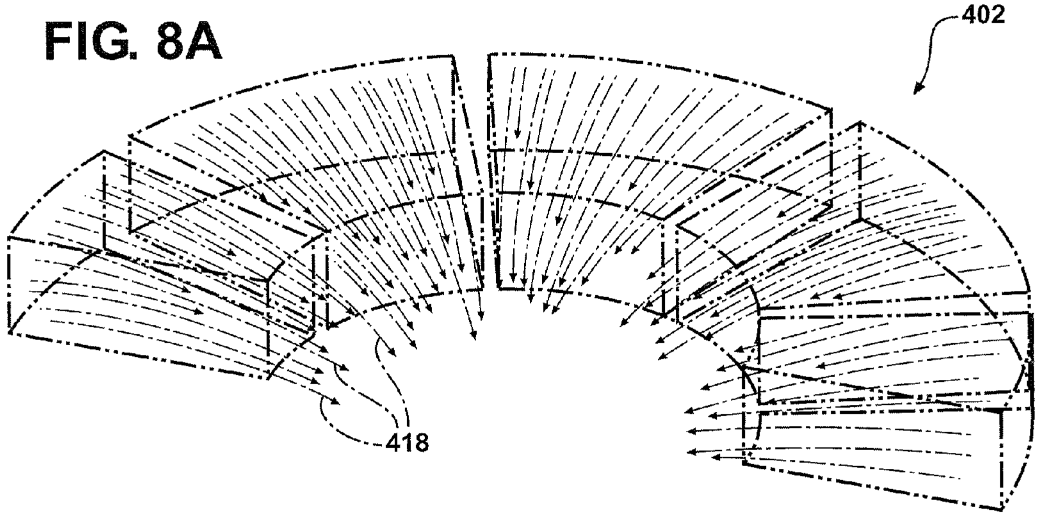
FIG. 8A is a cross sectional perspective schematic view illustrating the eccentric segmented ring armature of FIG. 8 having substantially even distribution of flux vectors, in accordance with the present invention.

Referring to FIG. 8, a solenoid, indicated generally at 400, is illustrated having a segmented ring armature 402 that is eccentric toward the right, a housing 404 portion, and a pole piece 406 portion. A first air gap 408 is located between the pole piece 406 and the segmented ring armature 402. A second air gap 410 is located between the segmented ring armature 402 and the housing 404. The illustrated eccentricity of the segmented ring armature 402 is exaggerated in that the segmented ring armature 402 is shown nearly in physical contact with the right side of the housing 404. A plurality of radial gaps 412 segment the segmented ring armature 402 into equally spaced segments 414. Each segment 414 is associated with a respective portion of the inner air gap 408 and outer air gap 410. When the coil 414 is energized, magnetic flux flows through the housing 404, pole piece 406, at least the magnetic materials of the segmented ring armature 402, and across the first and second air gaps 408,410. FIG. 8A illustrates the segmented ring armature 402 of FIG. 8 having a plurality of flux vectors, indicated generally as 418, extending radially and substantially evenly distributed about the eccentric segmented ring armature 402. The corresponding radial force is significantly reduced, e.g., by about 62%, while substantially preserving the desirable level of axial force, e.g., reducing the axial force by only about 17%. Thus, the radial gaps 412 interrupt the circumferential flux path about the segmented ring armature 402 to inhibit the magnetic flux from "swirling" around the segmented ring armature 402 to the side nearest to the pole piece 410 and the corresponding radial force is substantially evenly distributed.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A solenoid arrangement comprising:
- a magnetic coil;
- a housing;
- a pole piece forming part of a flux path;
- an armature member at least partly overlapping and circumscribing said pole piece and forming part of said flux path, said armature member moveable within an operably associated inner air gap and outer air gap; and
- two or more radial gaps to segment said armature member into two or more segments spaced apart for distributing magnetic flux substantially evenly and reducing a radial force acting on said armature member due to eccentricity of said armature member.

2. The solenoid arrangement of claim 1, wherein said inner air gap is located between said pole piece and said overlapped two or more segments and said outer air gap is located between said two or more segments and said housing, wherein eccentricity of said armature member results in a decrease in one of either said inner or outer air gaps and a corresponding increase in the other of said inner or outer air gaps.

3. The solenoid arrangement of claim 1, wherein said armature member further comprises a collar that is non-magnetic and connectable to said two or more segments for holding said two or more segments spaced apart and allowing movement of said armature member within said inner and outer air gaps.

4. The solenoid arrangement of claim 1, wherein said two or more radial gaps space said two or more segments an operable distance apart from one another to interrupt a circumferential flux path about said armature member for distributing magnetic flux substantially evenly and reducing said radial force acting on said armature member due to eccentricity of said armature member.

5. The solenoid arrangement of claim 1, wherein said two or more segments of said armature member each further comprise a flux finger that at least partly overlaps and circumscribes said pole piece to form said inner air gap located between said flux fingers and said pole piece to allow said magnetic flux to cross generally between said pole piece and said flux fingers.

6. The solenoid arrangement of claim 1, wherein said armature member is in operable association with a valve portion and movement of said armature member acts on said valve portion to impart force and do work, wherein said valve portion is selected from the group consisting of a hydraulic valve, a pneumatic valve, electrical valve, and combinations thereof.

7. The solenoid arrangement of claim 1, further comprising a guide pin partly slidably disposed within said pole piece and operably coupled to a collar of said armature member, wherein said guide pin is circumscribed and guided by two or more bearings.

8. A solenoid arrangement comprising:
- a magnetic coil for energizing magnetic flux in a flux path;
- a housing;
- a pole piece forming part of said flux path;
- an armature member at least partly overlapping and circumscribing said pole piece and forming part of said flux path, said armature member moveable within an operably associated inner air gap and outer air gap;
- a plurality of radial gaps to segment said armature member into a plurality of segments spaced apart for distributing magnetic flux substantially evenly and reducing a radial force acting on said armature member due to eccentricity of said armature member; and
- a collar that is non-magnetic and operably coupled to said plurality of segments for holding said plurality of segments spaced apart and allowing movement of said armature member within said inner and outer air gaps.

9. The solenoid arrangement of claim 8, wherein said inner air gap is located between said pole piece and said overlapped plurality of segments and said outer air gap is located between said plurality of segments and said housing, wherein eccentricity of said armature member results in a decrease in one of either said inner or outer air gaps and a corresponding increase in the other of said inner or outer air gaps.

10. The solenoid arrangement of claim 8, wherein said plurality of radial gaps space said plurality of segments an operable distance apart from one another to interrupt a circumferential flux path about said armature member for distributing magnetic flux substantially evenly and reducing said radial force acting on said armature member due to eccentricity of said armature member.

11. The solenoid arrangement of claim 8, wherein said plurality of segments of said armature member each further comprise a flux finger that at least partly overlaps and circumscribes said pole piece to form said inner air gap located between said flux fingers and said pole piece to allow said magnetic flux to cross generally between said pole piece and said flux fingers.

12. The solenoid arrangement of claim 8, wherein said armature member is in operable association with a valve portion and movement of said armature member acts on said valve portion to impart force and do work, wherein said valve portion is selected from the group consisting of a hydraulic valve, a pneumatic valve, electrical valve, and combinations thereof.

13. The solenoid arrangement of claim 8, further comprising a guide pin partly slidably disposed within said pole piece and operably coupled to said collar, wherein said guide pin is circumscribed and guided by two or more bearings.

14. A solenoid arrangement comprising:
- a magnetic coil;
- a housing forming part of a flux path;
- a pole piece forming part of a flux path;
- an armature member at least partly overlapping and circumscribing said pole piece and forming part of said flux path, said armature member moveable within an operably associated inner air gap and outer air gap;
- a guide pin partly slidably disposed within said pole piece and operably coupled to said armature member;
- two or more bearings coupled to said guide pin; and
- a plurality of radial gaps to segment said armature member into a plurality of segments spaced apart for distributing magnetic flux substantially evenly and reducing a radial force acting on said armature member due to eccentricity of said armature member.

15. The solenoid arrangement of claim 14, wherein said inner air gap is located between said pole piece and said overlapped two or more segments and said outer air gap is located between said two or more segments and said housing, wherein eccentricity of said armature member results in a decrease in one of either said inner or outer air gaps and a corresponding increase in the other of said inner or outer air gaps.

16. The solenoid arrangement of claim 14, wherein said armature member further comprises a collar operably coupled to said guide pin and to said plurality of segments, wherein said collar holds said plurality of segments an operable distance apart from one another to interrupt a circumferential flux path about said armature member for distributing magnetic flux substantially evenly and reducing said radial force acting on said armature member due to eccentricity of said armature member.

* * * * *